(12) United States Patent
Dai (10) Patent No.: US 9,559,989 B2
(45) Date of Patent: Jan. 31, 2017

(54) LINK PROBLEM HANDLING (71) Applicant: Hangzhou H3C Technologies Co., Ltd., Hangzhou (CN)

(72) Inventor: Yifan Dai, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/646,650

(22) PCT Filed: Dec. 23, 2013

(86) PCT No.: PCT/CN2013/090208
§ 371 (c)(1),
(2) Date: May 21, 2015

(87) PCT Pub. No.: WO2014/106438
PCT Pub. Date: Jul. 10, 2014

(65) Prior Publication Data
US 2015/0295861 A1    Oct. 15, 2015

(30) Foreign Application Priority Data
Jan. 6, 2013   (CN) .......................... 2013 1 0005089

(51) Int. Cl.
*H04L 12/26*   (2006.01)
*H04L 12/939*   (2013.01)
(Continued)

(52) U.S. Cl.
CPC ........... *H04L 49/557* (2013.01); *H04L 1/0001* (2013.01); *H04L 1/22* (2013.01); *H04L 45/22* (2013.01);
(Continued)

(58) Field of Classification Search
CPC .......................... H04L 41/0654; H04L 45/254
See application file for complete search history.

(56) References Cited

U.S. PATENT DOCUMENTS

| | | | |
|---|---|---|---|
| 6,910,149 | B2 | 6/2005 | Perloff et al. |
| 7,876,680 | B2 | 1/2011 | Kadambi et al. |
| (Continued) | | | |

FOREIGN PATENT DOCUMENTS

| | | |
|---|---|---|
| CN | 101018180 | 8/2007 |
| CN | 101605104 | 12/2009 |
| (Continued) | | |

OTHER PUBLICATIONS

"Configuring EtherChannels and Link-State Tracking", Cisco, Jul. 28, 2008.
(Continued)

*Primary Examiner* — Kevin C Harper
(74) *Attorney, Agent, or Firm* — Hewlett Packard Enterprise Patent Department (57) ABSTRACT

In a computer network comprising a stack device and a plurality of network devices, the plurality of network devices are each connected to the stack device via a respective aggregation link comprising a plurality of member links and the stack device comprises a first stack member and a second stack member connected to the first stack member via a stack link. A correspondence is formed between a first route and the first stack member. The first route is used by the first stack member for forwarding traffic from a first network device to a second network device of the plurality, and comprises a member link via which the traffic is forwarded from the first stack member. Upon detecting a link problem in the member link of the first route, the first route is found, the first stack member is identified based on the correspondence, and traffic information is sent to cause the first network device to migrate at least a proportion of the (Continued)

traffic to have been forwarded via the first route to a route that does not include the link having a link problem.

13 Claims, 6 Drawing Sheets

(51) Int. Cl.
*H04L 1/00* (2006.01)
*H04L 1/22* (2006.01)
*H04L 12/707* (2013.01)
*H04L 12/803* (2013.01)

(52) U.S. Cl.
CPC ..... *H04L 47/122* (2013.01); *H04L 2001/0092* (2013.01)

(56) References Cited

U.S. PATENT DOCUMENTS

| | | |
|---|---|---|
| 8,264,959 B2 | 9/2012 | Licardie et al. |
| 8,300,523 B2 | 10/2012 | Salam et al. |
| 2007/0133395 A1* | 6/2007 | Herring ............... H04Q 3/0079 370/216 |
| 2007/0237085 A1* | 10/2007 | Tirumalai ............ H04Q 3/0087 370/242 |
| 2008/0068983 A1* | 3/2008 | Dunbar ................. H04L 12/66 370/216 |
| 2009/0049196 A1* | 2/2009 | Smith .................... H04L 63/08 709/245 |
| 2012/0320739 A1* | 12/2012 | Kamath ................. H04L 45/66 370/225 |

FOREIGN PATENT DOCUMENTS

| | | |
|---|---|---|
| CN | 102404234 | 4/2012 |
| WO | WO-2012/136078 | 10/2012 |

OTHER PUBLICATIONS

International Search Report and Written Opinion dated Apr. 3, 2014 issued on PCT Patent Application No. PCT/CN2013/090208 dated Dec. 23, 2013, The State Intellectual Property Office, P.R. China.

* cited by examiner

| MAC ADDR | VLAN ID | STATE | PORT INDEX | AGING TIME(s) | STACK MEMBER INDEX |
|---|---|---|---|---|---|
| [address] | [ID] | [state] | [port ID] | AGING | [stack member ID] 320 |

300

| DESTINATION /MASK | NEXTHOP | FLAG | OUTINTERFACE/ TOKEN | STACK MEMBER INDEX | LABEL |
|---|---|---|---|---|---|
| nn.n.n.n/nn | mm.m.m.m | U | [port ID]/0/0 | [stack member ID] 330 | [label] |

Table A

| Destination IP | Outgoing interface |
| --- | --- |
| 1.1.1.1 to 1.1.1.200 | Bir1 (to 120) |
| 2.2.2.1 to 2.2.2.200 | Bir1 (to 120) |
| 3.3.3.1 to 3.3.3.200 | Bir1 (to 130) |
| 4.4.4.1 to 4.4.4.200 | Bir1 (to 130) |
| 13.13.13.1 to 13.13.13.200 | Bir1 (to 130) |
| 14.14.14.1 to 14.14.14.200 | Bir1 (to 130) |

Table B

| Destination IP | Outgoing interface |
| --- | --- |
| 5.5.5.1 to 5.5.5.200 | Bir2 (to 110) |
| 6.6.6.1 to 6.6.6.200 | Bir2 (to 110) |
| 7.7.7.1 to 7.7.7.200 | Bir2 (to 130) |
| 8.8.8.1 to 8.8.8.200 | Bir2 (to 130) |

Table C

| Destination IP | Outgoing interface |
| --- | --- |
| 9.9.9.1 to 9.9.9.200 | Bir3 (to 110) |
| 10.10.10.1 to 10.10.10.200 | Bir3 (to 110) |
| 11.11.11.1 to 11.11.11.200 | Bir3 (to 120) |
| 12.12.12.1 to 12.12.12.200 | Bir3 (to 120) |

Table D

| Destination IP | Outgoing interface |
| --- | --- |
| 1.1.1.1 to 1.1.1.200 | Bir2' (to 120) |
| 2.2.2.1 to 2.2.2.200 | Bir2' (to 120) |
| 3.3.3.1 to 3.3.3.200 | Bir3' (to 130) |
| 4.4.4.1 to 4.4.4.200 | Bir3' (to 130) |
| 5.5.5.1 to 5.5.5.200 | Bir1' (to 110) |
| 6.6.6.1 to 6.6.6.200 | Bir1' (to 110) |
| 7.7.7.1 to 7.7.7.200 | Bir3' (to 130) |
| 8.8.8.1 to 8.8.8.200 | Bir3' (to 130) |
| 9.9.9.1 to 9.9.9.200 | Bir1' (to 110) |
| 10.10.10.1 to 10.10.10.200 | Bir1' (to 110) |
| 11.11.11.1 to 11.11.11.200 | Bir2' (to 120) |
| 12.12.12.1 to 12.12.12.200 | Bir2' (to 120) |
| 13.13.13.1 to 13.13.13.200 | Bir3' (to 130) |
| 14.14.14.1 to 14.14.14.200 | Bir3' (to 130) |

LINK PROBLEM HANDLING

CLAIM FOR PRIORITY

The present application is a national stage filing under 35 U.S.C. §371 of PCT application number PCT/CN2013/090208, having an international filing date of Dec. 23, 2013, which claims priority to Chinese patent application number 201310005089.6, having a filing date of Jan. 6, 2013, the disclosures of which are hereby incorporated by reference in their entireties.

BACKGROUND

Link aggregation, or Ethernet link aggregation, is to form a logical aggregation link by aggregating a plurality of physical Ethernet ports. Each of the plurality of physical links that constitute the aggregation link is referred to as a member link. Link aggregation may be implemented using protocols such as a Link Aggregation Control Protocol LACP based on the IEEE 802.3ad standard (incorporated herein by reference).

The term "stacking" technology as used herein means to connect a plurality of devices together and "virtualize" (configure) them as a single virtual device. The virtual device is referred to as a stack device, and each of the plurality of devices that constitutes the stack device is referred to as a stack member, with the connection between each stack member being referred to as a stack link.

DETAILED DESCRIPTION

The present disclosure is explained in detail, by way of examples only, with reference to the accompanying drawings.

In an example, a computer network comprises a stack device and a plurality of network devices. The plurality of network devices are each connected to the stack device via a respective aggregation link, each aggregation link comprising a plurality of member links, and the stack device comprises a first stack member and a second stack member connected to the first stack member via a stack link. The stack device forms a correspondence between a first route and the first stack member. The first route is used by the first stack member for forwarding traffic from a first network device to a second network device of the plurality, and comprises a member link via which the traffic is forwarded from the first stack member. Upon detecting a link problem in the member link, the first route is found, the first stack member is identified based on the correspondence and traffic information is sent to cause the first network device to migrate at least a proportion of the traffic which was to have been forwarded via the first route to a route that does not include the link having a link problem.

In the example, when there is a link problem, since a proportion of the traffic that would have been forwarded by the problem link is migrated to another route that does not include the problem link, for example by the first network device switching to another output port, the traffic may be sent directly to another stack member of the stack device not directly connected to the problem link. The stack device may therefore forward the migrated traffic directly without first forwarding the traffic via a stack link. Therefore, in some examples, the route that does not include the problem link may also be such that it does not include the first stack member. In other words, traffic which is migrated may be migrated from the first stack member to the second stack member. It is therefore possible to reduce the load of the stack link when a link in the network is experiencing problems. Moreover, in some examples, the proportion of traffic to be migrated may be predetermined. It is therefore possible to control the amount of traffic to be diverted to the new route depending on different requirements.

In an example, each of the plurality of member links between each network device and the stack device are connected to a stack member. For example, there may be first member link from a first network device to a first stack member, and a second member link from the first network device to the second stack member.

Figure 1:
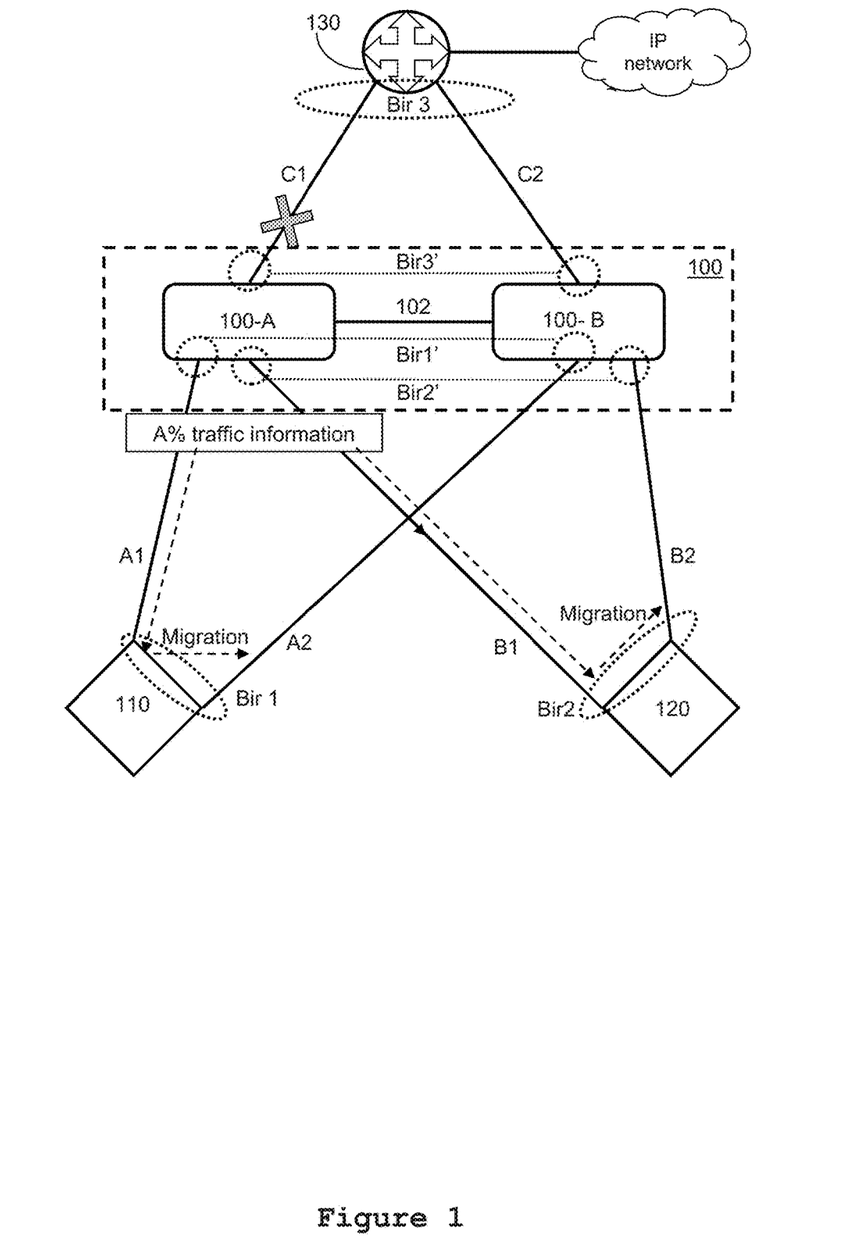
FIG. 1 is a schematic drawing of an example of a stack network configuration.

An example of a network configuration is shown schematically in FIG. 1, in which a stack device 100 is deployed. The stack device 100 comprises stack members 100-A and 100-B, and is connected to a downstream network device 110 via stack member 100-A by link A1 and via stack member 100-B by link A2 (A1 and A2 are member links of an aggregation link, having an aggregation interface Bir1 at downstream network device 110, and member links of an aggregation link having an aggregation interface Bir1' at the stack device 100), to a second downstream network device 120 via stack member 100-A by link B1 and via stack member 100-B by link B2 (B1 and B2 are member links of an aggregation link having an aggregation interface Bir2 at downstream network device 120, and member links of an aggregation link having an aggregation interface Bir2' at the stack device 100), and to an upstream network device 130 via both stack members 100-A and 100-B by links C1 and C2 (C1 and C2 are member links of an aggregation link having an aggregation interface Bir3 at network device 130, and member links of an aggregation link having an aggregation interface Bir3' at the stack device 100). The stack members 100-A and 100-B are connected to each other by a stack link 102. Link aggregation may be implemented using LACP and the devices may exchange link aggregation information in a LACPDU message. In other examples, the stack device 100 may comprise more than two stack members and may be connected to more than one upstream device and/or more than two downstream device via one or more of its stack members.

While the network devices have been identified as upstream and downstream devices respectively for the purposes of example, it will be understood that the stack device 100 serves to connect network devices in general. In addition, it will be understood that the network and stack link described are relatively simple examples, and that the teachings herein are equally applicable to more complicated networks, which may have more links, network devices, stack devices and/or stack members in a stack device.

When the link C1 fails (for example link down), communications between the downstream devices 110, 120 and the upstream device 130 can only be forwarded via the link C2. Since the stack member 100-A has no direct link to the upstream device 130, if the downstream device 110 continues to send traffic to the upstream device 130 via the link A1, and the downstream device 120 continues to send traffic to the upstream device 130 via the link B1, the stack member 100-A must forward the traffic to the stack member 100-B via the stack link 102, the stack member 100-B may then forward the traffic to the upstream device 130 via the link C2. This causes an increase in the work load of the stack link 102.

In the illustrated network configuration, there is a member link between each stack member 100-A and 100-B and each network device, and each member link is connected to a different stack member. In other examples, a plurality of member links within a single aggregation link could be provided from a particular stack member to a particular network device, each having an associated member link port.

According to an example of a method of link selection for handling a link problem in a network that comprises a stack device, such as the network shown in FIG. 1, the stack device 100 forms a correspondence between a first route and a stack member 100-A. Upon detecting a link problem in a link of the first route, such as a link down in the link C1, the stack device 100 finds the first route that includes the problem link C1, and identifies the stack member 100-A based on the correspondence. The stack device 100 then sends, from the stack member 100-A, traffic information to cause the network device 110 to migrate a predetermined proportion, for example A %, of the traffic which would have been forwarded via the links A1-C1 to a route that does not include the link C1, such as the route A2-C2. This also migrates the traffic from the first stack device 100-A to the second stack device 100-B.

The stack device 100 also sends, from the stack member 100-A, information to cause the network device 120 to migrate a predetermined proportion, for example A %, of the traffic which would have been forwarded via the links B1-C1 to the links B2-C2. This also migrates the traffic from the first stack device 100-A to the second stack device 100-B.

Figure 2:
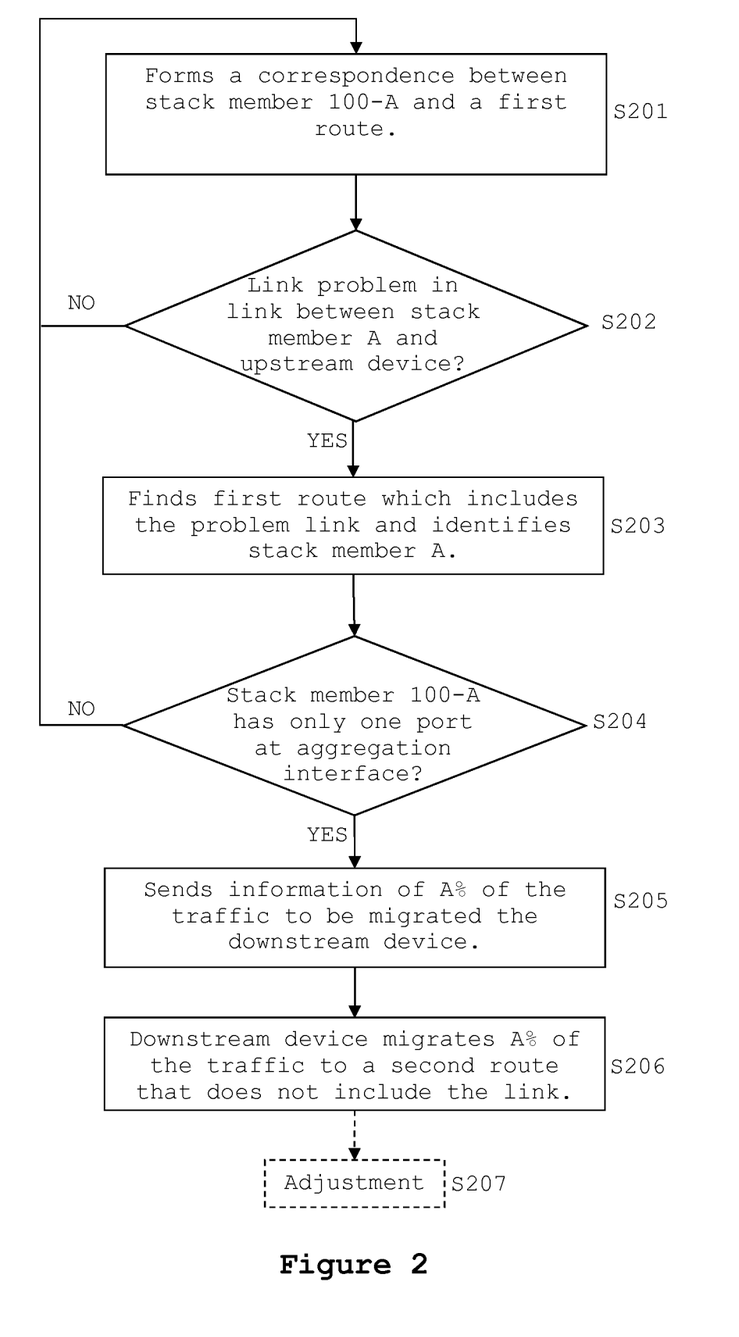
FIG. 2 is a flow diagram of an example of a method of link selection in a stack network.

A more detailed example of a method of link selection for handling a link problem is shown in the flow diagram of FIG. 2. The method may be implemented for example in the network of FIG. 1 by the stack device 100.

At block S201, the stack device 100 forms a correspondence between a stack member and a route used by the stack member, for example while forwarding unicast traffic between the downstream device and the upstream device. For example, the stack device 100 forms a correspondence between the stack member 100-A and the link C1 used to send data to the upstream device 130, as is further explained in relation to FIG. 3 below.

Figure 3:
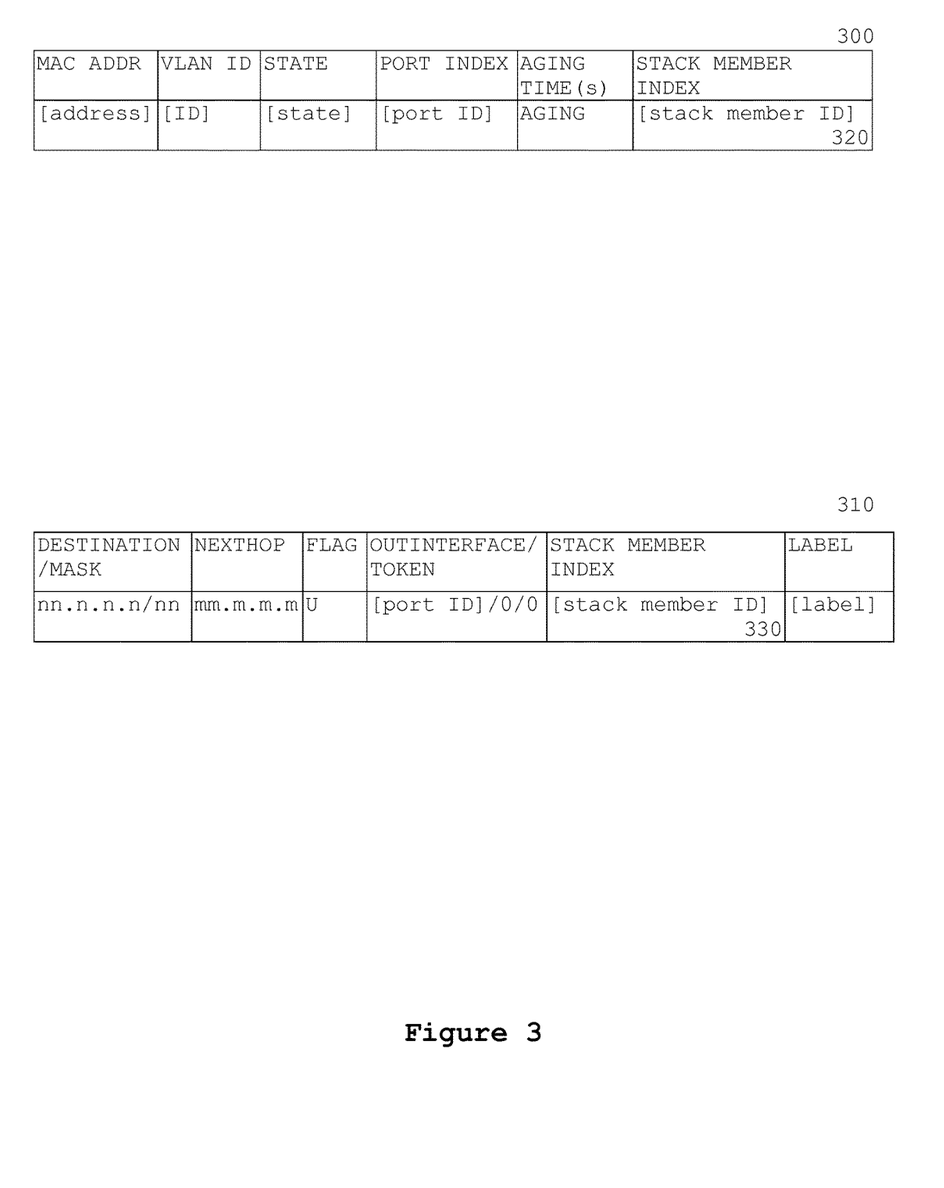
FIG. 3 are examples of forwarding tables.

In a specific implementation example, the stack member 100-A, in which the outgoing interfaces of the traffic resides, forms the correspondence by providing a tag that identifies itself in a forwarding entry in a forwarding table, as shown in FIG. 3.

In another example, if the forwarding entry is used by a plurality of stack members for forwarding traffic, the forwarding entry may be labeled with the tag of each of the plurality of stack members.

In a further example, an aging time may be set for each tag provided to a forwarding entry, such that a tag is removed from the forwarding entry when its aging time expires. A default aging time may for example be set as 10 LACP message periods.

Examples of forwarding tables are shown in FIG. 3, which shows a Media Access Control (MAC) forwarding table 300 and a Forwarding Information Base (FIB) table 310.

In an example shown herein, the MAC table 300 comprises a MAC ADDR field, which contains a MAC address, a VLAN ID field, which contains the ID of a VLAN to which the MAC address belongs, a STATE field which contains the state of a MAC address entry (for example Config static, i.e. a static entry manually is configured by the user; Config dynamic, i.e. the dynamic entry is manually configured by the user; or Learned i.e. the entry is learned by the device), a PORT INDEX field, containing the number of the port corresponding to the MAC address (identifying from which port packets destined to this MAC address are sent), and an AGING field which indicates whether the entry ages (as in this example) or does not age.

In this example, the MAC table 300 further comprises a STACK MEMBER INDEX field, in which a tag 320 comprising the identity of the stack member forwarding the traffic can be held. Adding such tag 320 creates a correspondence between the route used by the stack member for forwarding traffic and the stack member.

A MAC forwarding table 300 is used for 'layer 2 forwarding'. All stack members can use the same table 300 for layer 2 forwarding. A stack device 100 may search the table 300 based on the PORT INDEX field and the STACK MEMBER INDEX field to find a corresponding MAC address and VLAN ID.

The FIB table 310 comprises a DESTINATION/MASK field, comprising a Destination IP address and Network mask. A logical AND operation between the destination address and the network mask provides the address of the destination network. The table further comprises a NEXTHOP field, comprising the IP address of the next hop, a FLAG field comprising a Route flag, and OUTINTERFACE/TOKEN field giving the output interface used to forward traffic and a token comprising a Multiprotocol Label Switching (MPLS) Label Switched Path index number, and a LABEL field, comprising an inner label.

The FIB table 310 in this example further comprises a STACK MEMBER INDEX field, in which a tag 330 comprising the identity of the stack member forwarding the traffic can be held. Adding such tag 330 creates a correspondence between the route used by the stack member for forwarding traffic and the stack member.

In the following examples, the FIB table is used to create the correspondence between a route and a link having a link problem.

When a link problem is detected at block S202, for example a problem in the link C1, the stack device 100 finds one or more routes that comprise the problem link at block S203 (i.e. the stack device 100 finds information of traffic which has been sent through the link having a link problem), for example by looking up all forwarding entries in the forwarding table(s) that comprise the link C1. Using the correspondence formed at block S201, (e.g. the tag in the forwarding table) the stack device identifies the stack member that is connected to the problem link.

A link problem may for example be a link down in a member link of an aggregation link, or congestion in a member link.

It may be that a stack member has more than one link port associated with an aggregation link (i.e. has more than one member link to a particular network device). In an example, the stack device may determine at block S204 whether the stack member has only one port at an aggregation interface between the stack member and an aggregation link containing the problem link, and only proceed if it is determined that the stack member has only one port at the aggregation interface. If there is more than one port, a different port may be used to forward traffic so traffic migration to a different stack member may not be required.

At block S205, the stack device sends, via a direct link, traffic information relating to a predetermined proportion of the traffic to be migrated that would otherwise have been forwarded via the problem link to the network devices. For example, the stack device 100 may send traffic information of A % of the traffic would have been forwarded via C1 to the downstream devices 110 and 120.

In an example, the stack device transmits traffic information to cause the network devices to migrate at least a proportion of the traffic which would have been forwarded via the problem link by including the information in a TLV field of an LACP message. The traffic information may comprise a MAC address, a VLAN address and an IP address corresponding to the outgoing interface of the problem link. In practice, the information may be sent by any other suitable means.

In an example, when the link problem discovered at block S202 is an aggregation member link down (e.g. link C1 down), the stack device 100 sends information to cause migration of all of the traffic that was to have been forwarded via the problem link, C1, to the network devices 110, 120 connected directly to the stack member 100-A.

In another example, when the link problem discovered at block S202 is an aggregation member link congestion, the stack device 100 sends, via a directly connected link, the traffic information to cause migration of a predetermined proportion of the traffic to the network devices connected directly to the stack member. For example, the predetermined proportion may be A=50%.

In an example, the predetermined proportion may be determined by a convergence time required to clear the congestion. In the example, the predetermined proportion is made larger (by increasing A) when the convergence time is longer, and the predetermined proportion made smaller (by decreasing A) when the convergence time is shorter.

In an example, after the traffic information of the predetermined proportion of the traffic to be migrated is sent to any network devices connected directly to the stack member, the one or more tags provided to the forwarding entry that corresponds to the problem link may be removed.

In an example, when there is a large amount of information to be sent, the stack device may send the information in a sequential manner to improve the speed at which the network devices that receive the information process the entries.

Upon receiving the information of the predetermined proportion of the traffic, at block S206, the network devices migrate the corresponding traffic from the route comprising the problem link to a different route based on the received traffic information.

In an example, this may be achieved by migrating the traffic to be sent to the member port at the aggregation interface that corresponds to the problem link to another member port. In the example, the network devices parse a TLV field in an LACP message sent by the stack device to obtain the information of the predetermined proportion of the traffic to be migrated. The information include a MAC address, VLAN address and IP address corresponding to the problem link. The network devices migrate the traffic destined to the original member port to the new member port based on the received MAC, VLAN and IP. The stack device then forwards the traffic from the new member port upon receiving the traffic from the network devices.

When the link problem is congestion in a member link, traffic migration may cause cyclic congestions in the links—the traffic migration from a first link causes congestion in a second link, which in turn causes traffic migration back to the first link that then becomes congested, thus causing repeated migration of traffic. In an example, a timer may be set when a stack member sends the information of a predetermined proportion of traffic to one or more network devices to cause traffic migration.

In the example, in a case of member link congestion, the stack device determines whether or not a member link remains congested after a first predetermined period. If so, the stack device sends the information again and resets the timer, until it is determined that there is no congestion in the problem link within one first predetermined period. More specifically, the timer begins when the stack member sends the traffic information of the predetermined proportion of the traffic to be migrated. If the problem member link is still in a congestion state when one first predetermined period has elapsed, transmission of the traffic information is repeated and the timer is reset, until the problem member link is no longer congested within one first predetermined period. If the problem link is not congested upon the timer reaching one first predetermined period, the stack device determines whether or not the problem link is congested during a second, longer, predetermined period, for example, three times the first predetermined period. If the problem link becomes congested again within the second predetermined period (three first predetermined periods), it is determined to be reciprocating congestion caused by the migration of traffic. In this case, part of the migrated traffic may be migrated back to a route which includes the problem link. In an example, an oscillation suppression coefficient B (smaller than 1) may be applied to the predetermined proportion (for example A %) of the traffic to be migrated. By multiplying the predetermined proportion, A %, with the oscillation suppression coefficient B ($<1$), a smaller proportion of the traffic is migrated away from the problem link, or in other words, the previously migrated traffic is partially migrated back to the problem link. The value of the coefficient B may be decreased to increase the amount of traffic to be migrated back. Otherwise, the value of the coefficient B may be increased to reduce the amount of traffic being migrated back to the problem link. The process may be terminated when the traffic to be migrated back to the problem link is smaller than a preset value.

It may be the case that congestion in a stack link is seen because, after a link problem has occurred, such as 'link down', new traffic is received at a network device which has not been migrated, and at least some of this traffic may be sent to the stack member which is directly connected to the link having a link problem, for forwarding by the link having a link problem. In this case, at least a portion of the new traffic could be migrated.

In one such example, when congestion in the stack link occurs, the stack device determines whether or not the stack link remains congested within a first predetermined period. If so, in order to relieve the stack link, the predetermined proportion of the traffic to be migrated from the stack link may be increased so as to eliminate the congestion from the stack link more quickly. In an example, a rapid convergence coefficient C ($>1$) is may be applied to the predetermined proportion of the traffic to be migrated. If the stack link is still in a congestion state after one first predetermined period has elapsed, the predetermined proportion of the traffic to be migrated may be increased by a factor C. For example, if the predetermined proportion is A %=50%, the rapid convergence coefficient may be set as C=1.2, and so the increased predetermined proportion is (C×A %)=1.2×50%=60%. When the information of the increased predetermined proportion of the traffic is sent, the timer is reset. If the stack link is still in a congestion state after one first predetermined period after sending the information of the increased predetermined proportion of the traffic, the predetermined proportion may be increased again, for example by another factor of C, $(1.2^2 \times 50\% = 72\%)$.

A more detailed example will be described with reference to FIG. 4. The link problem of the link C1 shown in FIG. 1 is used here for illustration of the example. In FIG. 3, Table A, Table B, Table C and Table D are the IP entries of the downstream device 110, the downstream device 120, the upstream device 130 and the stack device 100 respectively, where Bir1, Bir2 and Bir3 are the aggregation interfaces at the network devices and Bi31', Bir2' and Bir3' are the aggregation interfaces at the stack device 100, as shown in FIG. 1.

Figure 4:
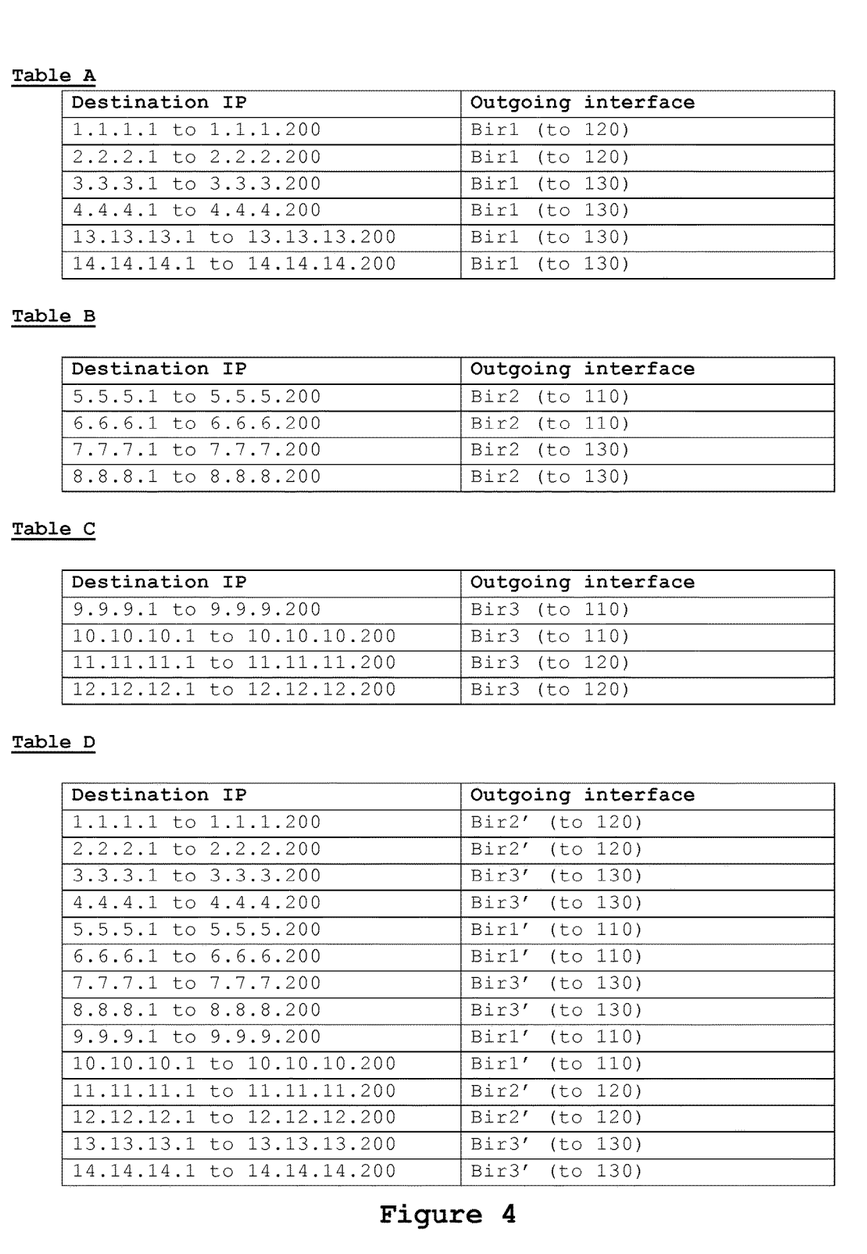
FIG. 4 are tables of IP entries.

It will be understood that the tables shown in FIG. 4 are examples of traffic flows but are not examples of look-up tables for finding a route. In a network, routes between devices may not be predetermined. For example, when forwarding data, the downstream device may search a table, which may be, or may be similar to the forwarding table 310, to identify an outgoing interface, and selects a particular port of that interface, for example based on a HASH calculation to perform load sharing. In turn, the stack member 100-A will also search such a table using the destination IP address to identify an outgoing interface (although, as in the example set out herein, there is only one outgoing port from a stack member to a network device, once the 'next hop' destination has been identified, the link on which the traffic should be sent is also identified).

In the example, the downstream device 110 receives the traffic of 400 data flows, the destination IPs of which are 1.1.1.1 to 1.1.1.100, 2.2.2.1 to 2.2.2.100, 3.3.3.1 to 3.3.3.100, and 4.4.4.1 to 4.4.4.100. The aggregation interface at the downstream network device 110, Bir1, performs load sharing. It therefore transmits the data flows 1.1.1.1 to 1.1.1.100 and 3.3.3.1 to 3.3.3.100 via the link A1, and transmits the data flows 2.2.2.1 to 2.2.2.100 and 4.4.4.1 to 4.4.4.100 via the link A2. The stack device 100 receives the 400 data flows via the respective aggregation member links, and checks its own table of IP entries to determine the forwarding interface of the received data flows. The stack device is configured to send the data flows 1.1.1.1 to 1.1.1.100 from the aggregation interface Bir2', which includes the links B1 and B2, which belong to different stack members. As the data flows 1.1.1.1 to 1.1.1.100 have been received at stack member 100-A, the 100 data flows are transmitted via the link B1, as this is the only member link which locates at the interface Bir2 at this stack member 100-A. Similarly, the data flows 2.2.2.1 to 2.2.2.100, which are received by stack member 100-B are sent via B2, the data flows 3.3.3.1 to 3.3.3.100 are sent via C1, and the data flows 4.4.4.1 to 4.4.4.100 are sent via C2.

In the example, the downstream device 120 receives the traffic of 400 data flows, the destination IPs of which are 5.5.5.1 to 5.5.5.100, 6.6.6.1 to 6.6.6.100, 7.7.7.1 to 7.7.7.100 and 8.8.8.1 to 8.8.8.100. The data flows 5.5.5.1 to 5.5.5.100 are forwarded via B1 then A1, the data flows 6.6.6.1 to 6.6.6.100 are forwarded via B2 then A2, the data flows 7.7.7.1 to 7.7.7.100 are forwarded via B1 then C1, and the data flows 8.8.8.1 to 8.8.8.100 are forwarded via B2 then C2.

In the example, the upstream device 130 also receives the traffic of 400 data flows, destination IPs of which are 9.9.9.1 to 9.9.9.100 (which are forwarded to the downstream device 110 by links C1 and A1), 10.10.10.1 to 10.10.10.100 (which are forwarded to the downstream device 110 by links C2 and A2), 11.11.11.1 to 11.11.11.100 (which are forwarded to the downstream device 120 by links C1 and B1) and 12.12.12.1 to 12.12.12.100 (which are forwarded to the downstream device 120 by links C2 and B2).

Thus, in the example, there are 200 pieces of upstream traffic and 200 pieces of downstream traffic on each aggregation member link. For instance, the upstream traffic in A1 includes 1.1.1.1 to 1.1.1.100 and 3.3.3.1 to 3.3.3.100 transmitted from the downstream device 110, and the downstream traffic includes 5.5.5.1 to 5.5.5.100 transmitted from the downstream device 110 and 9.9.9.1 to 9.9.9.100 transmitted from the upstream device 130.

In the example, when the link C1 is down, the stack device finds all the entries in Table D that have Bir3' as the outgoing interface and have been sent by stack member 100-A, as this data would have been sent via link C1 (i.e. data flows 3.3.3.1 to 3.3.3.100 and 7.7.7.1 to 7.7.7.100). Information of this traffic, in this example the IP addresses, is to the downstream devices 110 and 120 via all the ports of stack member 100-A which are directly connected to the downstream devices (i.e. via link A1 of the interface Bir1, link B1 of the interface Bir2). The downstream device 110 receives the information via A1 and determines that, of the 200 entries under the link A1 (1.1.1.1 to 1.1.1.100 and 3.3.3.1 to 100) in Table A, the received information matches 100 entries, i.e. 3.3.3.1 to 3.3.3.100. The downstream device 110 thus changes the outgoing port for all the matching entries from the port of link A1 to the outgoing port link A2, so as to migrate the traffic that would have been transmitted by the problem link C1 to a route which does not include this link (or in this case to migrate the traffic from a route including the stack member 100-A to a route which does not include this stack member). Similarly, the downstream device 120 receives the information, checks Table B, and changes the outgoing port for the entries 7.7.7.1 to 7.7.7.100, so that they are sent via B2 instead of B1.

In the example, after the outgoing ports have been changed as described above, the upstream traffic of each of the links A1 and B1 includes only 100 data flows, and the downstream traffic of each of the links A1 and B1 also includes only 100 data flows, namely data flows 1.1.1.1 to 1.1.1.100 from downstream device 110 to downstream device 120 (A1 upstream and B1 downstream), and the data flow 5.5.5.1 to 5.5.5.100 from downstream device 120 to downstream device 110 (A1 downstream, B1 upstream). On the other hand, the upstream and downstream traffic of each of the links A2 and B2 each includes 300 data flows, namely, the data flows 2.2.2.1 to 2.2.2.100 from downstream device 110 to downstream device 120 (A2 upstream, B2 downstream), the data flows 6.6.6.1 to 6.6.6.100 from downstream device 120 to downstream device 110 (A2 downstream, B2 upstream), the data flows 3.3.3.1 to 3.3.3.100 and 4.4.4.1 to 4.4.4.100 from downstream device 110 to upstream device 130 (A2 upstream), the data flows 9.9.9.1 to 9.9.9.100 and 10.10.10.1 to 10.10.10.100 from upstream device 130 to downstream device 110 (A2 downstream), the data flows 7.7.7.1 to 7.7.7.100 and 8.8.8.1 to 8.8.8.100 from downstream device 120 to upstream device 130 (B2 upstream), and the data flows 11.11.11.1 to 11.11.11.100 and 12.12.12.1 to 12.12.12.100 from upstream device 130 to downstream device 120 (B2 downstream). It is possible that the traffic migration may cause congestion in the links A2 and B2.

In an example, when it is determined that the link A2 is experiencing congestion, a predetermined proportion, A %, of the traffic using A2 may be migrated. As an example, the predetermined proportion may be 75% (A=75). Entries using A2 include 6.6.6.1 to 6.6.6.100, 9.9.9.1 to 9.9.9.100 and 10.10.10.1 to 10.10.10.100. The entries 9.9.9.1 to 9.9.9.100 are migrated from C1 to C2 after C1 is down, and so the entries are new compared to the other entries (i.e. compared to the entries 6.6.6.1 to 6.6.6.100 and 10.10.10.1 to 10.10.10.100). In the example, older entries may be preferentially migrated from A2. Thus, the downstream network device 120 migrates data flows 6.6.6.1 to 6.6.6.100 from B2 to B1. The data flows 10.10.10.1 to 10.10.10.100 and 9.9.9.25 are sent from the aggregation port for C2. However, these cannot be migrated as, in this example, C2 is the only port available from network device 130. If the traffic data is sent, upon reception, the upstream device 130 determines that the received information corresponding to 125 entries of Table C, including the data flows 9.9.9.1 to 9.9.9.25 and 10.10.10.1 to 10.10.10.100, but only one link C2 is available for connecting to the stack device 100, and so migration cannot be performed. When the downstream device 120 receives the information from B2 and compares it with Table B, it determines that the entries 6.6.6.1 to 6.6.6.100 correspond to the received information, and thus migrates the traffic of 6.6.6.1 to 6.6.6.100 from the outgoing port for B2 to the outgoing port for B1.

Similarly, in an example, if B2 is experiencing congestion, information of a proportion of the traffic to have been sent via B2 may be sent, which causes the downstream device 110 to migrate the traffic of 2.2.2.1 to 2.2.2.100 from the outgoing port A2 to the outgoing port A1. After the migrations, the traffic load on each of A1, A2, B1, and B2 are equal, each handling 200 data flows upstream and 200 data flows downstream.

In an example, if new traffic of 200 data flows 13.13.13.1 to 13.13.13.100 and 14.14.14.1 to 14.14.14.100 arrives at the downstream device 110 to be sent to the upstream device 130. These IP addresses were not included in traffic information to cause migrations as discussed above, so there is initially no consideration of the state of the links. Instead, the downstream device 110 performs load balancing for the interface Bir1 according to its configuration, and in this example sends the traffic of 13.13.13.1 to 13.13.13.100 via A1 and the traffic of 14.14.14.1 to 14.14.14.100 via A2. In the example, the stack member 100-A receives the traffic of the data flows 13.13.13.1 to 13.13.13.100 and determines that the outgoing interface is Bir3', for example by considering a forwarding table, but there is no available port at the outgoing interface Bir3' from the stack device 100-A since the link C1 is down. The received traffic of the data flows 13.13.13.1 to 13.13.13.100 is therefore sent to the stack member 100-B via the stack link 102, and forwarded via C2 by the stack member 100-B. The traffic of the data flows 14.14.14.1 to 14.14.14.100 to 14.14.14.1 to 14.14.14.100 is received from A2 by the stack member 100-B and forwarded via C2. When there is a large volume of new traffic arriving, this may cause congestion in the stack link 102. In order to relieve the congestion in the stack link 102, in the example, the information of a predetermined proportion of the traffic to be sent from downstream network device 110 to the stack member 100-A via link A1 (13.13.13.1 to 13.13.13.100), for example 75%, may be sent from the aggregation ports of the stack member 100-A. Upon receiving the information, if the information matches the entries in the downstream device 110, the downstream device 100 migrates the traffic of 13.13.13.1 to 13.13.13.75 from A1 to A2.

In one example, if there is congestion on the stack link 120, the stack device 100 searches the forwarding table 310 to find the IP addresses which use link C1 to forward traffic, and selects a portion of the IP addresses, which selected portion of addresses is sent to the downstream network devices to cause them to migrate the proportion of traffic that would have been sent to the first stack member 100-A to the second stack member.

In another example, if a link remains congested within a first predetermined period after the traffic has been migrated, the predetermined proportion (75%) of traffic to be migrated may be increased, for example by multiplying it with a coefficient greater than 1. By migrating an increased proportion of the traffic from A1 to A2, the congestion in the link may be eliminated more quickly. If the link remains congested after increasing the proportion of traffic to be migrated, the increased proportion may be multiplied by the coefficient again to further increase the proportion traffic to be migrated to eliminate the congestion in the link more quickly.

An example of a stack device 500 suitable for implementing the methods described above is shown in FIG. 5. The stack device 500 comprises a tagging module 510, a look-up module 520 and a sending module 530. The tagging module 510 is configured to form a correspondence between a first route and a first stack member (e.g. stack member 100-A), the first route being used by the first stack member for forwarding traffic from a first network device (e.g. downstream device 110) to a second network device (e.g. upstream device 130), and the first route comprises a link (e.g. C1) via which the traffic is forwarded between the first stack member and the first network device. The look-up module 520 is configured to find the first route and identify the first stack member based on the correspondence upon detecting a link problem in the link. The sending module 530 is configured to send traffic information to cause the first network device to migrate at least a proportion (e.g. A %) of the traffic to have been forwarded via the first route to a route that does not include the link.

Figure 5:
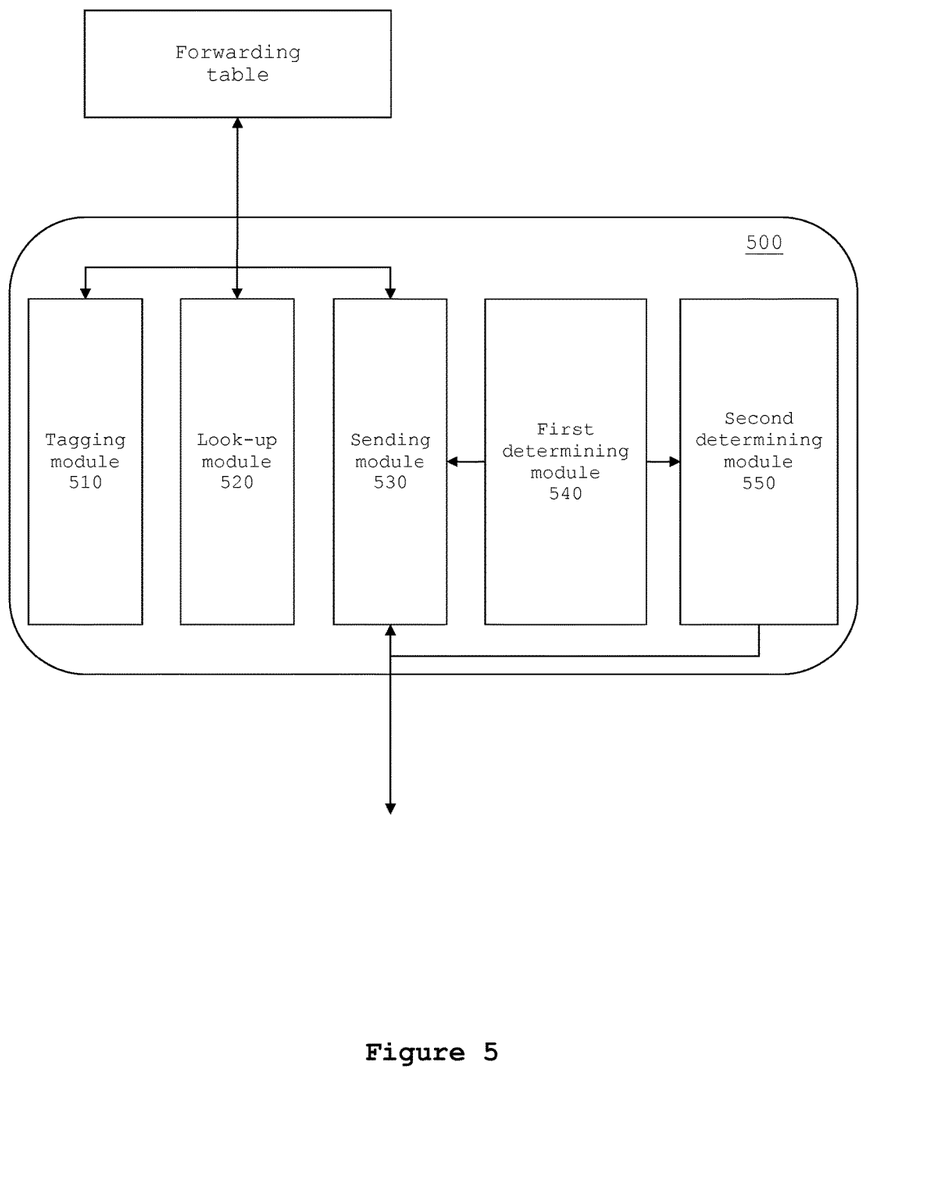
FIG. 5 is a schematic diagram of an example of a device for performing a method of link selection.

In an example, the sending module 530 may be configured to determine whether the first stack member has only one port at the aggregation interface between the stack member and the aggregation link containing the problem link, and to send the traffic information from the first stack member when it is determined that the first stack member has only one port.

In an example, when the problem link is an aggregation member link and the aggregation member link is down, the sending module 530 may be configured to send traffic information to cause the first network device to migrate all of the traffic to have been forwarded via the first route to a route that does not include the problem link.

In an example, the stack device 500 may further comprise a first determining module 540. In the example, when the link problem is congestion, the first determining module 540 may be configured to determine whether the link is congested after a first predetermined period. If so, the first determining module 540 may be configured to increase the predetermined proportion, and cause the sending module to send information of the increased predetermined proportion of the traffic from the first stack member to cause the first network device to migrate the increased predetermined proportion of the traffic to a route that does not include the problem link.

In an example, the first determining module 540 may be configured to determine, in a case where the problem is link congestion, whether the member link is congested after a first predetermined period. If so, the first determining module 540 may be configured to cause the sending module 530 to continue sending traffic information to cause the first network device to migrate the predetermined proportion of the traffic from the first route to a route that does not include the link. In the example, the stack device 500 may further comprise a second determining module 550. If the first determining module 540 determines that the member link is not congested after the first predetermined period, the second determining module 550 may be configured to determine whether the member link is congested after a second predetermined period. The second predetermined period may be set longer than the first predetermined period. If so, the second determining module 550 determines that the link congestion is in a state of oscillation and may be configured to decrease the predetermined proportion, and cause the sending module 530 to send information of the decreased predetermined proportion of the traffic from the first stack member to cause the first network device to migrate the decreased predetermined proportion of the traffic to a route that does not include the problem link.

In an example, the tagging module 510 may be configured to form the correspondence between the first route and the first stack member by providing a tag to an entry corresponding to the first route in a forwarding table, the tag being provided for identifying the first stack member.

In an example, the sending module 530 may be configured to send the information in a TLV field of a Link Aggregation Control Protocol LACP message, and the information may comprise a MAC address, a VLAN address and an IP address of an outgoing interface that corresponds to the problem link.

The above-described tagging module 510, look-up module 520, sending module 530, first determining module 540 and second determining module 550 may be provided to each stack member of the stack device integrally or separately, or may be provided to the stack device integrally or separately to be shared amongst the stack members.

An example of a device that may be provided to or integrated in a network device for implementing the methods described above is shown in FIG. 6. The device 600 may be used in an upstream network device or a downstream network device in a network as shown in FIG. 1.

Figure 6:
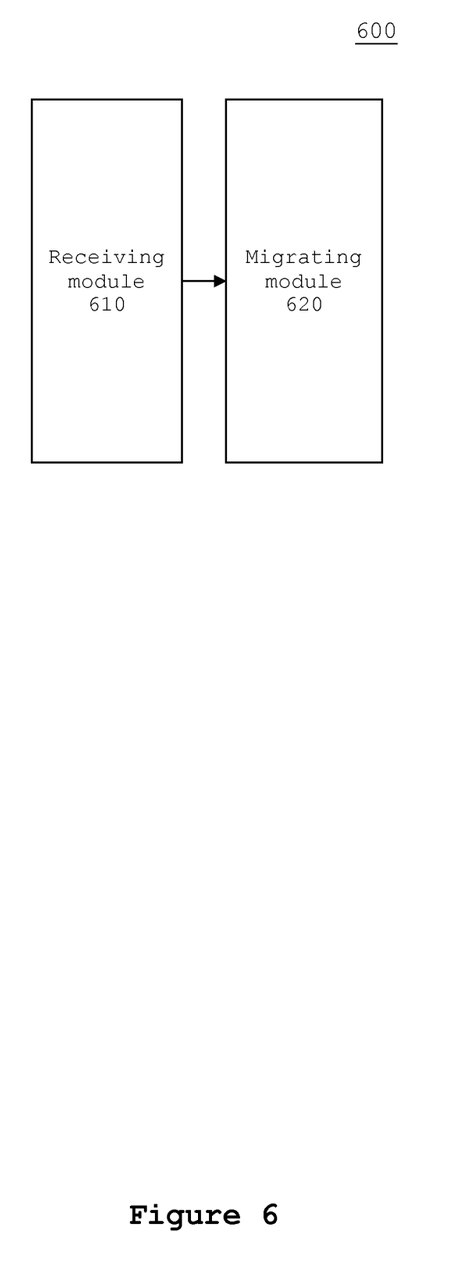
FIG. 6 is a schematic diagram of an example of another device for performing a method of link selection.

The device 600 comprises a receiving module 610 and a migrating module 620. The receiving module 610 is configured to receive traffic information relating to a predetermined proportion of traffic which would have been forwarded via a problem link, which information may be sent by a stack device (e.g. stack device 100) via a directly connected link. When the receiving module 610 receives the information of the predetermined proportion of the traffic, the migrating module 620 is configured to migrate the corresponding traffic, for example by migrating the traffic from the original port at the corresponding aggregation interface to another port using the received information.

In an example, the receiving module 610 may be configured to receive, by means of a TLV field in an LACP message, traffic information of the predetermined proportion of the traffic. The traffic information may comprise a MAC address, VLAN and IP addresses corresponding to the outgoing interface of the problem link.

According to the examples of a method for selecting a link when a stack device experiences a link problem, a predetermined proportion of the traffic to have been forwarded via the problem link is caused to migrate to a different route that does not include the problem link. Thus, the migrated traffic may be migrated from a first stack member to a second stack member in a stack device that is not directly connected to the problem link, and the migrated traffic may be forwarded directly by the second stack member without passing through a stack link between the first stack member and the second stack member. It is therefore possible to effectively reduce the work load of a stack link when a link is experiencing a problem.

Moreover, since the proportion of the traffic to be migrated may be predetermined, it is possible to control the amount of traffic to be migrated depending on the requirements of oscillation convergence and/or the speed of reducing congestion in a link.

Although the flow diagram described above show a specific order of execution, the order of execution may differ from that which is depicted.

The above examples can be implemented by hardware, software, firmware, or a combination thereof. For example, the various methods and functional modules described herein may be implemented by a processor (the term processor is to be interpreted broadly to include a CPU, processing unit, ASIC, logic unit, or programmable gate array etc.). The methods and functional modules may all be performed by a single processor or divided amongst several processors. The methods and functional modules may be implemented as machine readable instructions executable by one or more processors, hardware logic circuitry of the one or more processors, or a combination thereof. Further, the teachings herein may be implemented in the form of a software product, the computer software product being stored in a storage medium and comprising a plurality of instructions for making a computer device (e.g. a personal computer, a server or a network device such as a router, switch, access point etc.) implement the method recited in the examples of the present disclosure.

It should be understood that embodiments of the method and devices described above are implementation examples only, and do not limit the scope of the invention. Numerous other changes, substitutions, variations, alternations and modifications may be ascertained by those skilled in the art, and it is intended that the present disclosure encompass all such changes, substitutions, variations, alterations and modifications as falling within the spirit and scope of the appended claims.

The invention claimed is:

1. A method for use in a computer network, the computer network comprising a stack device and a plurality of network devices, each network device of the plurality being connected to the stack device via a respective aggregation link comprising a plurality of member links, the stack device comprising a first stack member and a second stack member connected to the first stack member via a stack link, the method comprising:

forming a correspondence between a first route and a first stack member, the first route being used by the first stack member for forwarding traffic from a first network device to a second network device of the plurality and comprising a member link via which the traffic is forwarded from the first stack member;

upon detecting a link problem in the member link of the first route, finding the first route and identifying the first stack member based on the correspondence; and sending traffic information to cause the first network device to migrate at least a proportion of the traffic to have been forwarded via the first route to a route that does not include the link having a link problem only if determined that the first stack member has only one link port at an aggregation link interface between the first stack member and an aggregation link containing the link having a link problem.

2. The method of claim 1 in which the route to which traffic is migrated includes the second stack member and does not include the first stack member.

3. The method of claim 1 in a case where the link problem is link down, wherein sending traffic information is to cause the first network device to migrate all the traffic to a route that does not include the link having a link problem.

4. The method of claim 1 in which sending traffic information is to cause at least one network device to migrate a predetermined proportion of the traffic to have been forwarded via the first route to a route that does not include the link having a link problem.

5. The method of claim 4 in a case where the link problem is link congestion, the method further comprising:
   the stack device determining whether a link is congested after a first predetermined period and, if so, increasing the predetermined proportion and sending traffic information to cause the first network device to migrate the increased predetermined proportion of the traffic to have been forwarded via the first route to a route that does not include the link having a link problem.

6. The method of claim 4 in a case where the problem is link congestion, the method further comprising:
   determining whether the member link is congested after a first predetermined period,
   if so, continue sending traffic information to cause the first network device to migrate the predetermined proportion of the traffic to have been forwarded via the first route to a route that does not include the link having a link problem;
   if not, determining whether the member link is congested after a second predetermined period, the second predetermined period being longer than the first predetermined period and, if so, determining that the link congestion is in a state of oscillation, decreasing the predetermined proportion, and sending traffic information to cause the first network device to migrate the decreased predetermined proportion of the traffic to have been forwarded via the first route to a route that does not include the link having a link problem.

7. The method of claim 1 wherein the forming correspondence between the first route and the first stack member comprises providing a tag to an entry corresponding to the first route in a forwarding table that identifies the first stack member.

8. The method of claim 1 wherein the traffic information is sent in a TLV field of a Link Aggregation Control Protocol LACP message, and the information comprises a MAC address, a VLAN address and an IP address of an outgoing interface that corresponds to the link.

9. A method for use in a Link Aggregation Control Protocol LACP stack network, the stack network comprising a stack device and a plurality of network devices, each network device of the plurality being connected to the stack device via a respective LACP link, the stack device comprises a first stack member and a second stack member connected to the first stack member via a stack link, the method comprising the stack device:
   providing a tag in a forwarding table used by a stack member when forwarding unicast traffic to identify the stack member from which traffic is forwarded on an LACP link;
   upon detecting a link problem in an LACP link, identifying the stack member based on the tag; and
   only if the stack member has only one LACP aggregation interface member port at an interface at which the link locates, sending traffic information, via a directly connected link, to cause the first network device to migrate at least a proportion of the traffic from a corresponding LACP aggregation interface member port to at least one other LACP aggregation interface member port.

10. A stack device for use in a computer network, the computer network comprising the stack device and a plurality of network devices, each network device of the plurality being connected to the stack device via a respective aggregation link comprising a plurality of member links, the stack device comprising:
   a first stack member and a second stack member connected to the first stack member via a stack link;
   a tagging module to form a correspondence between a first route and the first stack member, the first route being used by the first stack member for forwarding traffic from a first network device to a second network device of the plurality and comprising a member link via which the traffic is forwarded from the first stack member;
   a look-up module to find the first route and identify the first stack member based on the correspondence upon detecting a link problem in the member link of the first route; and
   a sending module to send traffic information to cause the first network device to migrate at least a proportion of the traffic to have been forwarded via the first route to a route that does not include the link having a link problem only if determined that the first stack member has only one link port at an aggregation link interface between the first stack member and an aggregation link containing the link having a link problem.

11. The stack device of claim 10 in a case where the link problem is link down, wherein the sending module is to send traffic information to cause all of the traffic to be migrated from the first route to a route that does not include the link having a link problem.

12. The stack device of claim 10 in which the sending module is to send traffic information to cause the first network device to migrate a predetermined proportion of the traffic to have been forwarded via the first route to a route that does not include the link having a link problem, and further comprising:
   a first determining module to determine, in a case where link problem is link congestion, whether the link is congested after a first predetermined period and, if so, to increase the predetermined proportion, and to cause the sending module to send traffic information to cause migration of the increased predetermined proportion of the traffic from the first route to a route that does not include the link having a link problem.

13. The stack device of claim 10 in which the sending module is to send traffic information to cause the first network device to migrate a predetermined proportion of the traffic to have been forwarded via the first route to a route that does not include the link having a link problem, and further comprising:
   a first determining module to determine, in a case where the problem is link congestion, whether the member link is congested after a first predetermined period and, if so, to cause the sending module to continue sending traffic information to cause the predetermined proportion of the traffic to migrate from the first route to a route that does not include the link having a link problem; and a second determining module to, if the first determining module determines that the member link is not congested after the first predetermined period, determine whether the member link is congested after a second predetermined period, the second predetermined period being longer than the first predetermined period and, if so, to determine that the link congestion is in a state of oscillation and decrease the predetermined proportion, and cause the sending module to send traffic information to cause the first network device to migrate the decreased predetermined proportion of the traffic from the first route to a route that does not include the link having a link problem.

* * * * *